(No Model.)  2 Sheets—Sheet 1.
C. J. ROBINSON.
MACHINE FOR MAKING DOWEL PINS.
No. 331,733.  Patented Dec. 1, 1885.

Witnesses
Jos. S. Latimer
J. S. Brown.

Inventor
Charles Jonathan Robinson
By his Attorney
Arthur Browne (No Model.) 2 Sheets—Sheet 2.

C. J. ROBINSON.
MACHINE FOR MAKING DOWEL PINS.

No. 331,733. Patented Dec. 1, 1885.

Witnesses
Jos. S. Latimer
J. S. Brown

Inventor
Charles Jonathan Robinson
By his Attorney
Arthur Browne

UNITED STATES PATENT OFFICE.

CHARLES JONATHAN ROBINSON, OF BATTLE CREEK, MICHIGAN, ASSIGNOR OF ONE-HALF TO ROLDON P. KINGMAN, OF SAME PLACE.

MACHINE FOR MAKING DOWEL-PINS.

SPECIFICATION forming part of Letters Patent No. 331,733, dated December 1, 1885.

Application filed September 7, 1885. Serial No. 176,359. (No model.)

*To all whom it may concern:*

Be it known that I, CHARLES JONATHAN ROBINSON, a citizen of the United States, residing at Battle Creek, in the county of Calhoun and State of Michigan, have invented certain new and useful Improvements in Machines for Making Dowel-Pins; and I do hereby declare the following to be a full, clear, and exact description of the invention, reference being had to the accompanying drawings, which form a part of this specification.

This invention relates to machines designed for the manufacture of cylindrical dowel-pins pointed at both ends, and is illustrated in the accompanying drawings, in which—

Figure 1:
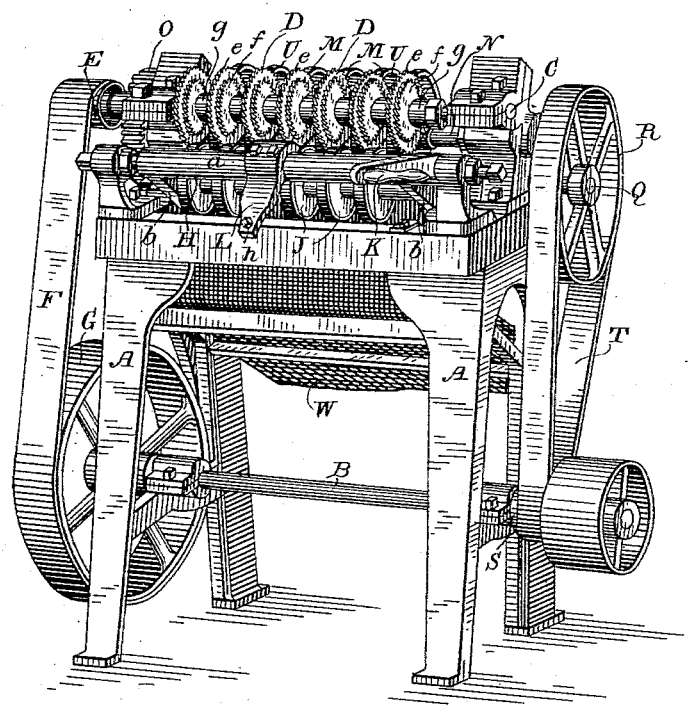
Figure 4:
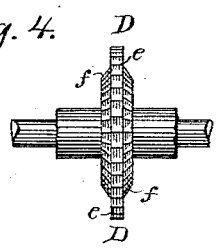
Figure 2:
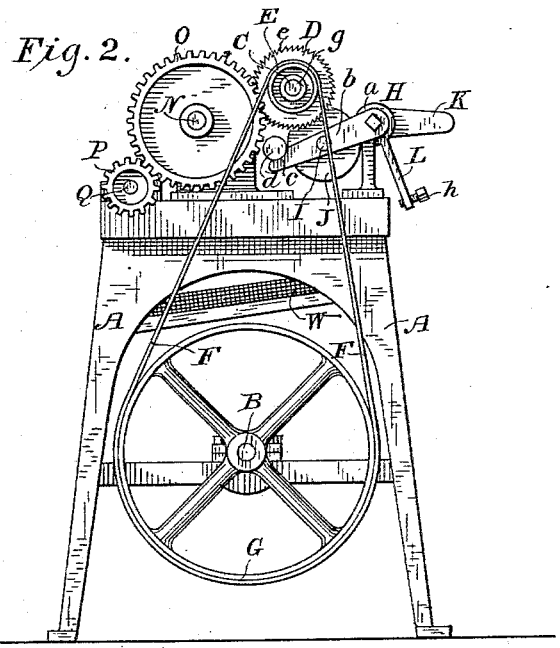
Figure 3:
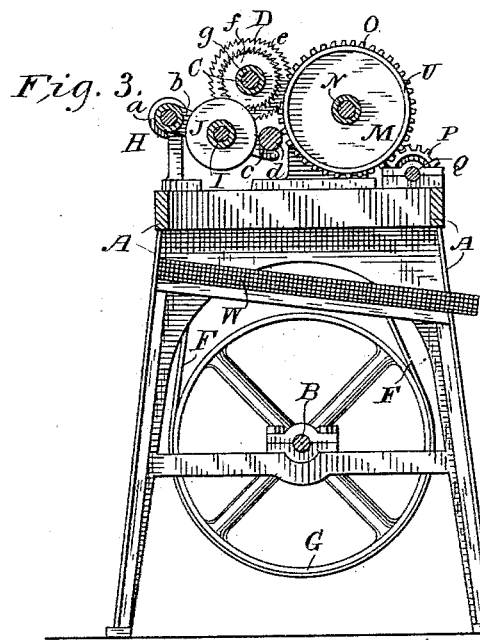

Figure 1 is a perspective view of the machine; Fig. 2, a side view thereof; Fig. 3, a vertical cross-section; Fig. 4, an edge view of one of the saws, and Fig. 5 a view of the finished dowel-pin.

Like letters designate corresponding parts in all of the figures.

A is the frame-work of the machine, and B is the main driving-shaft. On the upper part of the frame-work in suitable brackets is journaled a shaft, C, which carries a series of circular saws, D D. This shaft carries a small pulley, E, on one end, which is rotated by a belt, F, passing over a large pulley, G, carried by the main driving-shaft. Immediately in front of and below the saw-shaft a frame, H, is pivotally-mounted in suitable brackets on the main frame. This frame consists of a longitudinal bar, a, having arms b b, which incline downwardly and rearwardly, so that their ends are normally located below the lowest point of the saws. The lower ends of these arms are curved on their upper edges, as shown at c, in order that they may securely retain the material from which the dowel-pins are cut. This material consists of a long cylindrical rod (indicated at d) previously turned and cut to a proper size, which is inserted lengthwise at one end of the machine, so as to rest on the ends of the arms b b beneath the saws. Mounted in the arms b b is a shaft, I, which carries a series of idler-rollers, J J, against the peripheries of which the dowel-rod rests when in position on the arms b b. These idler-rollers are so arranged that they occupy positions between the saws D D, alternating therewith in order that they may fulfill their function without interfering with the oscillation of frame H. The oscillating dowel-rod carrying frame is turned on its pivots in order to bring the dowel-rod in contact with the saws by means of a handle, K. This handle, being depressed, elevates the arms b b and brings the dowel-rod in contact with the saws, which cut the rod into dowel sections or pins of proper length.

Figure 5:

In order to taper the pins at both ends, as shown in Fig. 5, each saw is a triple saw. Each saw, besides having the usual peripheral teeth, e e, which divide the dowel-rod into sections, has on each side a series of teeth or cutters, f f, which are beveled at their cutting-edges in order to taper or point the dowel-sections, the angle of the bevel determining the acuteness of the points of the finished pins. The length of the pins is determined by the distance between the saws, and as these saws, with the exception of the end ones, are provided with tapering cutters on both sides the pins are tapered or pointed at both ends.

In order that pins of different lengths may be cut by the same machine, the saws are removable from their shaft and are separated by removable collars g g. By inserting collars of different lengths the distance between the saws may be changed, and thus pins of different lengths be cut.

In order that the ends of the pins may be uniformly tapered throughout the entire circumference of the pin, it is necessary that the dowel-rod should be cut by the saw-teeth e e exactly to its axial center, and that the rod itself should be rotated while being sawed into proper lengths.

In order to bring the dowel-rod into proper position without fail, the oscillating dowel-rod-carrying frame H is provided with a stop-rod-carrying arm, L, which, coming in contact with a fixed portion of the frame A, limits the upward motion of the dowel-rod-carrying arms b b.

In order to adapt the machine to the manufacture of pins of different diameter, the stop-arm L is rendered adjustable by means of a set-screw, h.

The dowel-rod is rotated in order that the pins may be properly tapered and entirely separated by a series of slowly-rotating friction-feeding rollers, M M. These feeding-rollers are carried by a shaft, N, journaled in suitable bearings on the frame-work behind and below the saw-arbor C. These feeding-rollers are so arranged that they occupy positions between the saws D D, alternating therewith, and in line with the idler-rollers I I, respectively, whereby their peripheries are brought within a short distance of those of the idler-rollers. The shaft N carries a large pinion, O, which gears with a small pinion, P, carried by an intermediate driving-shaft, Q, mounted in the frame-work below the shaft N. This shaft Q carries a large pulley, R, which is driven from a small pulley, S, on the main driving-shaft B by a belt, T. By this arrangement of gearing the rod-feeding rollers M M are rotated in a direction opposite to that of the saws, and at a very much lower speed.

When the dowel-rod is brought into contact with the rotating circular saws by the upward oscillation of the dowel-rod-carrying frame, it is at the same time brought into contact with the peripheries of the feeding-rollers, which then rotate the rod on its axis by direct contact with the same. The rod is retained in proper position on the oscillating frame during the process of cutting by being held between the peripheries of the idler-rollers and feeding-rollers, and it is prevented from rising up toward the saws, owing to the direction in which the feeding-rollers rotate. These rollers rotate in such a direction that they constantly press the dowel-rod down against the surface of the holding-arms $b$ $b$.

In order that the feeding-rollers M M may effectively rotate the dowel-rod, they are provided with elastic tires U, made of rubber or other suitable material. These elastic tires not only enable the feeding-rollers to obtain a better hold upon the dowel-rod, but when dowel-rods of different diameters are to be operated upon they enable the feeding-rollers to accommodate themselves to such different sizes of rods.

If necessary, the distance between the rollers M M and rollers J J may be respectively adjusted by means of removable collars of different lengths, similar to the collars $g$ $g$, which separate the saws.

The finished pins fall into a screen, W, which conducts them to a suitable receptacle.

I claim as my invention—

1. In a dowel-pin machine, a series of circular saws which cut a dowel-rod into sections, and an oscillating dowel-rod-carrying frame which brings said rod into contact with said saws, in combination with rotating feeding-rollers which rotate said dowel-rod by contact with the same when said rod is brought into contact with the saws, substantially as set forth.

2. In a dowel-pin machine, a series of circular saws which cut a dowel-rod into sections, and an oscillating dowel-rod-carrying frame which brings said rod into contact with said saws, in combination with a series of idler-rollers mounted in said rod-carrying frame against the peripheries of which said dowel-rod rests, and rotating feeding-rollers which rotate said dowel-rod by contact with the same when said rod is brought into contact with the saws, substantially as set forth.

3. In a dowel-pin machine, a series of circular saws provided with peripheral teeth which cut a dowel-rod into sections, and provided with beveled teeth or cutters on the sides thereof, which point the ends of said dowel-sections, in combination with an oscillating dowel-rod-carrying frame which brings said dowel-rod into contact with said saws, and rotating feeding-rollers which rotate said dowel-rod by contact with the same when said rod is brought into contact with the saws, substantially as set forth.

4. In a dowel-pin machine, a series of circular saws which cut a dowel-rod into sections, in combination with an oscillating dowel-rod-carrying frame which brings the dowel-rod into contact with said saws, and a stop-arm on said rod-frame, which, by contact with a fixed stop, automatically limits the extent of the oscillation of said frame, substantially as set forth.

5. In a dowel-pin machine, a series of circular saws provided with peripheral teeth which cut a dowel-rod into sections, and provided with beveled teeth or cutters on the sides thereof, which point the ends of said dowel-sections, in combination with an oscillating dowel-rod-carrying frame which brings the dowel-rod into contact with said saws, and an adjustable stop-arm on said rod-frame, which, by contact with a fixed stop, automatically limits the extent of the oscillation of said frame, substantially as set forth, whereby, owing to the adjustability of said stop-arm, the same machine may be adapted to the manufacture of dowel-pins of different diameter.

6. In a dowel-pin machine, a series of circular saws mounted on the same arbor which cut a dowel-rod into sections, an oscillating dowel-rod-carrying frame located beneath said arbor, which frame brings the dowel-rod into contact with said saws, and a series of idler-rollers mounted on said oscillating frame, against the peripheries of which said rod rests, said idler-rollers being located between and alternating with said circular saws, in combination with a series of rotating feeding-rollers, which rotate said dowel-rod by contact with the same when said rod is brought into contact with the saws, said feeding-rollers being mounted on the same shaft and located between and alternating with said circular saws, and in the same line with said idler-rollers, respectively, substantially as set forth.

7. In a dowel-pin machine, a series of circular saws provided with peripheral teeth, which cut a dowel-rod into sections, and provided with beveled teeth or cutters on the sides thereof, which point said dowel-sections, an oscillating dowel-rod-carrying frame, which brings the dowel-rod into contact with said saws, and an adjustable stop-arm on said rod-frame, which, by contact with a fixed stop, limits the extent of the oscillation of said frame, whereby, owing to the adjustability of said stop-arm, dowel-rods of different diameters may be cut by said saws to the axial centers thereof, in combination with rotating feeding-rollers which rotate said dowel-rod by contact with the same when said rod is brought into contact with the saws, said feeding-rollers being provided with elastic tires, substantially as set forth, whereby they may accommodate themselves to dowel-rods of different diameters.

8. In a dowel-pin machine, an oscillating dowel-rod-carrying frame, a series of idler-rollers mounted in line thereon, and a series of circular saws having beveled teeth or cutters on their sides, said saws being mounted on an arbor above and behind said rod-carrying frame, in combination with a series of feeding-rollers which rotate slowly in a direction opposite to that of the rotation of the saws, which hold said dowel-rod in contact with the said idler-rollers and rotate the same while being operated upon by said saws, and which are mounted on a shaft below and behind said saw-arbor, substantially as set forth.

9. In a dowel-pin machine, a main driving-shaft carrying a large and a small pulley, a saw-arbor carrying a series of saws and a small pulley, a belt connecting said arbor-pulley with the large pulley on the main shaft, and a dowel-rod-carrying frame which brings a dowel-rod into contact with said saws, in combination with a feeding-roller shaft provided with feeding-rollers, which rotate the dowel-rod when in contact with said saws, said roller-shaft carrying a large pinion, an intermediate driving-shaft carrying a small pinion, (which meshes with the pinion on the roller-shaft,) and a large pulley, and a belt connecting said large pulley with the small pulley on the main driving-shaft, substantially as set forth.

In testimony whereof I affix my signature in presence of two witnesses.

CHARLES JONATHAN ROBINSON.

Witnesses:
STEVEN S. HULBERT,
GEORGE W. MECHEM.